United States Patent
Nam et al.

(10) Patent No.: US 12,542,163 B2
(45) Date of Patent: Feb. 3, 2026

(54) DATA PROCESSING SYSTEM, OPERATING METHOD THEREOF, AND COMPUTING SYSTEM USING THE SAME

(71) Applicant: SK hynix Inc., Gyeonggi-do (KR)

(72) Inventors: Ji Hoon Nam, Gyeonggi-do (KR); Joo Young Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 874 days.

(21) Appl. No.: 17/720,620

(22) Filed: Apr. 14, 2022

(65) Prior Publication Data

US 2023/0097363 A1 Mar. 30, 2023

(30) Foreign Application Priority Data

Sep. 24, 2021 (KR) .................. 10-2021-0126503

(51) Int. Cl.
*G06N 3/08* (2023.01)
*G11C 7/08* (2006.01)
(Continued)

(52) U.S. Cl.
CPC .......... *G11C 7/1012* (2013.01); *G11C 7/1039* (2013.01); *G11C 7/16* (2013.01); *G11C 11/54* (2013.01)

(58) Field of Classification Search
CPC ....... G11C 7/1012; G11C 7/1039; G11C 7/16; G11C 11/54; G11C 7/1006;
(Continued)

(56) References Cited

U.S. PATENT DOCUMENTS 9,214,227 B2 * 12/2015 Kim .................... G11C 13/004
2018/0285255 A1 10/2018 Yeoh
(Continued)

FOREIGN PATENT DOCUMENTS

CN 107992624 A 5/2018
CN 109219797 A 1/2019
(Continued)

OTHER PUBLICATIONS

Notice of Allowance for the Chinese Patent Application No. 202210958866.8 issued by the Chinese Patent Office on Nov. 26, 2025.
(Continued)

*Primary Examiner* — Brandon S Cole
(74) *Attorney, Agent, or Firm* — IP & T GROUP LLP

(57) ABSTRACT

A data processing system may include: a controller configured to receive a neural network processing request from a host device; a processing memory including: one or more sub arrays each including memory cells coupled between row lines and column lines; multiplexers (MUXs) provided for respective column line groups, which are configured by grouping the column lines by a preset number; and analog-to-digital converters (ADCs) coupled to the respective MUXs; and a deserializer. The deserializer is configured to receive, from the controller, data to be stored in a selected sub array and a first column address at which the data is to be stored, and remap the first column address to a second column address such that the data is distributed and stored in the memory cells coupled to the column line groups, in order to store the data in the sub array.

20 Claims, 9 Drawing Sheets

(51) Int. Cl.
*G11C 7/10* (2006.01)
*G11C 7/12* (2006.01)
*G11C 7/16* (2006.01)
*G11C 11/54* (2006.01)

(58) Field of Classification Search
CPC .......... G11C 13/0007; G11C 13/0023; G11C 13/004; G11C 16/26; G11C 16/08; G11C 11/1653; G06N 3/065; G06N 3/0442; G06N 3/047; G06N 3/0464; G06N 3/08; G06N 5/02; G06F 7/544
See application file for complete search history.

(56) References Cited

U.S. PATENT DOCUMENTS

| | | | |
|---|---|---|---|
| 2019/0147329 A1* | 5/2019 | Hekmatshoartabari | G06V 10/82 706/26 |
| 2019/0295656 A1* | 9/2019 | Clinton | G11C 16/26 |
| 2020/0160157 A1 | 5/2020 | Kim et al. | |
| 2020/0183749 A1 | 6/2020 | Chen et al. | |
| 2022/0043502 A1* | 2/2022 | Kale | G06F 1/3225 |
| 2022/0058471 A1* | 2/2022 | Ramesh | G06F 7/483 |
| 2022/0309328 A1* | 9/2022 | Saxena | G06F 7/5443 |

FOREIGN PATENT DOCUMENTS

| | | |
|---|---|---|
| CN | 109885252 A | 6/2019 |
| CN | 110673856 A | 1/2020 |
| CN | 111047031 A | 4/2020 |
| CN | 1112199036 A | 1/2021 |
| CN | 112970007 A | 6/2021 |
| KR | 10-2019-0128795 A | 11/2019 |
| KR | 10-2020-0090089 A | 7/2020 |
| WO | 2019067980 A1 | 4/2019 |

OTHER PUBLICATIONS

Bin Huang et al., Data storage information serialization completeness and efficiency evaluation simulation, Apr. 15, 2020, pp. 159-163, vol. 37, China Academic Journal Electronic Publishing House.

* cited by examiner

DATA PROCESSING SYSTEM, OPERATING METHOD THEREOF, AND COMPUTING SYSTEM USING THE SAME

CROSS-REFERENCES TO RELATED APPLICATION

The present application claims priority under 35 U.S.C. § 119(a) to Korean patent application number 10-2021-0126503, filed on Sep. 24, 2021, which is incorporated herein by reference in its entirety.

BACKGROUND

1. Technical Field

Various embodiments of the present disclosure generally relate to a data processing technology, and more particularly, to a data processing system for neural network processing, an operating method thereof, and a computing system using the same.

2. Related Art

As much attention is paid to Artificial Intelligence (AI) applications and big data analysis while the importance thereof is increased, there is an increasing demand for a computing system capable of efficiently processing big data.

An artificial neural network is one method for implementing AI. The purpose of the artificial neural network is to raise the concern solving ability of a machine, i.e., the inference ability, through learning. However, the higher the accuracy of output, the larger the computation amount and the size of a computing processor.

SUMMARY

In an embodiment of the present disclosure, a data processing system may include: a controller configured to receive a neural network processing request from a host device; a processing memory including: one or more sub arrays each including a plurality of memory cells coupled between a plurality of row lines and a plurality of column lines; a plurality of multiplexers (MUXs) provided for respective column line groups, which are configured by grouping the plurality of column lines by a preset number; and a plurality of analog-to-digital converters (ADCs) coupled to the respective MUXs; and a deserializer configured to: receive, from the controller, data to be stored in a selected sub array and a first column address at which the data is to be stored, and remap the first column address to a second column address such that the data is distributed and stored in the memory cells coupled to the plurality of column line groups, in order to store the data in the sub array.

In an embodiment of the present disclosure, a data processing system may include: a controller configured to receive a neural network processing request from a host device; one or more sub arrays each including: a plurality of memory cells coupled between a plurality of row lines and a plurality of column lines, and a plurality of analog-to-digital converters (ADCs) provided for respective column line groups, which are configured by grouping the plurality of column lines by a preset number; and a deserializer configured to: receive, from the controller, data to be stored in a selected sub array and a first column address at which the data is to be stored, remap the first column address to a second column address to maximize a number of ADCs, which operate at the same time among the plurality of ADCs, and store the data in the selected sub array.

In an embodiment of the present disclosure, an operating method of a data processing system may include: providing an in-memory processing device including one or more sub arrays each including a plurality of memory cells coupled between a plurality of row lines and a plurality of column lines, a plurality of multiplexers (MUXs) provided for respective column line groups, which are configured by grouping the plurality of column lines by a preset number, and a plurality of analog-to-digital converters (ADCs) coupled to the respective MUXs; receiving, by a controller for controlling the in-memory processing device, a neural network processing request from a host device; receiving, by the in-memory processing device, data to be stored in a selected sub array and a first column address at which the data is to be stored; remapping, by the in-memory processing device, a first column address to a second column address such that data to be stored in the selected the sub array is distributed and stored in the memory cells coupled to the plurality of column line groups; and storing, by the in-memory processing device, the data in the selected sub array.

In an embodiment of the present disclosure, a computing system may include: a host device; and a data processing system including: a processing memory including: a sub array including a plurality of memory cells coupled between a plurality of row lines and a plurality of column lines; and a plurality of Analog-to-Digital Converters (ADCs) provided for respective column line groups, which are configured by grouping the plurality of column lines by a preset number; and a deserializer configured to: receive, from a controller, data to be stored in the sub array and a first column address at which the data is to be stored, and remap the first column address to a second column address such that the data is distributed and stored in the memory cells coupled to the plurality of column line groups, in order to store the data in the sub array.

In an embodiment of the present disclosure, an in-memory device may include: a processing element (PE) including: a cell array coupled to row lines and column lines, the column lines being divided into N number of groups; and analog-to-digital converters (ADCs) each coupled to a corresponding group and each configured to analog-to-digital convert a signal input thereto; and a control unit configured to: divide, in a column direction, a weight matrix of M×M array into N number of sub-matrices each of M×(M/N) array, store each of the sub-matrices into cells of M×(M/N) array coupled to the corresponding group, control the PE to perform a convolution operation on the stored sub-matrices and an input matrix to output results to the ADCs through respective groups, and configure outputs of the ADCs into an output matrix of M×M array such that output matrix elements have a same locations as corresponding weight matrix elements within the M×M array.

DETAILED DESCRIPTION

Hereafter, various embodiments of the present technology will be described in more detail with reference to the accompanying drawings.

Figure 1:
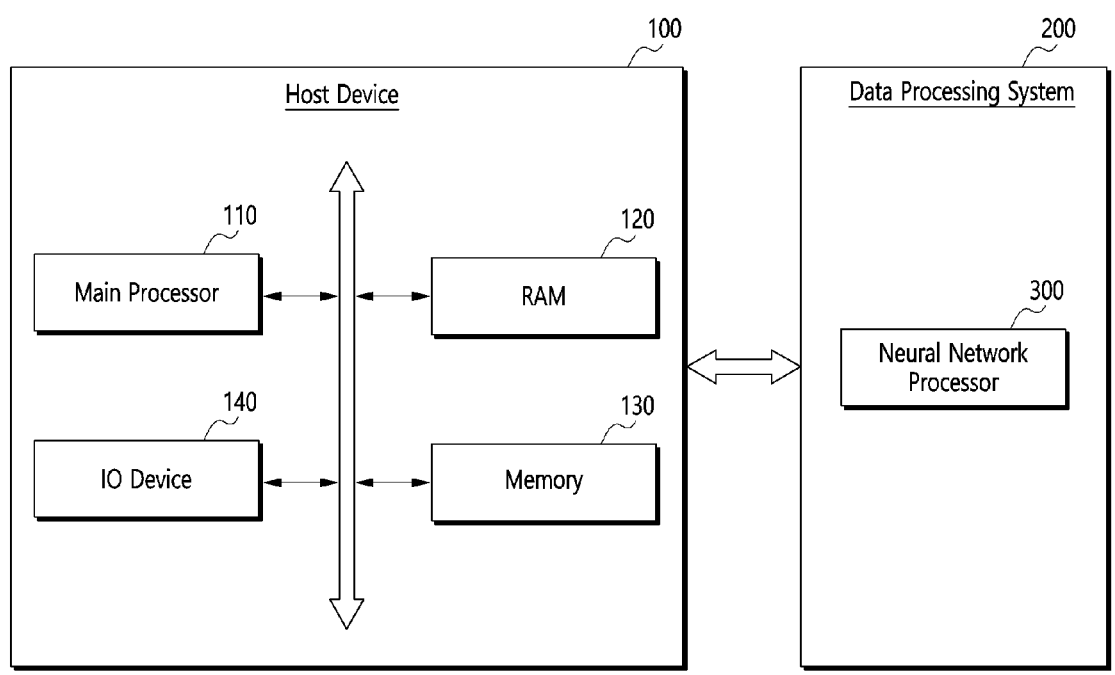
FIG. 1 is a configuration diagram illustrating a computing system in accordance with an embodiment of the present disclosure.

FIG. 1 is a configuration diagram illustrating a computing system in accordance with an embodiment of the present disclosure.

A computing system 10 may include a host device 100 and a data processing system 200. The data processing system 200 may include a neural network processor 300 configured to process a computing operation of an application requested by the host device 100.

The host device 100 may include at least function blocks such as a main processor 110, a RAM 120, a memory 130 and an input/output (I/O) device 140, and further include other general-purpose components (not illustrated).

In an embodiment, the components of the host device 100 may be integrated as one semiconductor chip and implemented as SoC (System on Chip). However, the components of the host device 100 are not limited thereto, but may be implemented as a plurality of semiconductor chips.

The main processor 110 may control overall operations of the computing system 10. For example, a Central Processing Unit (CPU) may serve as the main processor 110. The main processor 110 may include one or more cores. The main processor 110 may process or execute programs, data and/or instructions stored in the RAM 120 and the memory 130. For example, the main processor 110 may control the functions of the computing system 10 by executing the programs stored in the memory 130.

The RAM 120 may temporarily store programs, data or instructions. The programs and/or data stored in the memory 130 may be temporarily loaded to the RAM 120 according to a booting code or under control of the main processor 110. The RAM 120 may be implemented as a memory such as a Dynamic RAM (DRAM) or Static RAM (SRAM).

The memory 130 may serve as a storage place for storing data, and store an Operating System (OS), various programs and various data, for example. The memory 130 may include one or more of a volatile memory and a non-volatile memory. The non-volatile memory may be selected from a Read Only Memory (ROM), Programmable ROM (PROM), Electrically Programmable ROM (EPROM), Electrically Erasable and Programmable ROM (EEPROM), flash memory, Phase-change RAM (PRAM), Magnetic RAM (MRAM), Resistive RAM (RRAM), Ferroelectric RAM (FRAM) and the like. The volatile memory may be selected from a DRAM, SRAM, Synchronous DRAM (SDRAM) and the like. In an embodiment, the memory 130 may be implemented as a storage device such as a Hard Disk Drive (HDD), Solid-State Drive (SSD), Compact Flash (CF), Secure Digital (SD), Micro Secure Digital (Micro-SD), Mini Secure Digital (Mini-SD), extreme digital (xD) or memory stick.

The I/O device 140 may receive a user input or input data from the outside, and output a data processing result of the computing system 10. The I/O device 140 may be implemented as a touch screen panel, keyboard or various types of sensors. In an embodiment, the I/O device 140 may collect information around the computing system 10. For example, the I/O device 140 may include an imaging device and an image sensor, sense or receive an image signal from the outside of the data processing system 200, convert the sensed or received image signal into image data, and store the image data in the memory 130 or provide the image data to the data processing system 200.

The data processing system 200 may extract valid information by analyzing input data on the basis of an artificial neural network, in response to a request of the host device 100, and determine a situation on the basis of the extracted information or control components of an electronic device in which the data processing system 200 is mounted. For example, the data processing system 200 may be applied to a drone, Advanced Drivers Assistance System (ADAS), smart TV, smart phone, medical device, mobile device, image display device, measurement device, Internet of Things (IoT) device and the like. In addition, the data processing system 200 may be mounted in any of various types of computing systems 10.

In an embodiment, the host device 100 may offload neural network processing onto the data processing system 200, and provide the data processing system 200 with initial parameters for the neural network processing, for example, input data and weight matrix.

In an embodiment, the data processing system 200 may be an application processor mounted in a mobile device.

The data processing system 200 may include at least the neural network processor 300.

The neural network processor 300 may generate a neural network model by learning input data, generate an information signal by processing input data according to the neural network model, or retrain the neural network model. The neural network may include various types of neural network models such as Convolution Neural Network (CNN), Region with Convolution Neural Network (R-CNN), Region Proposal Network (RPN), Recurrent Neural Network (RNN), Stacking-based Deep Neural Network (S-DNN), State-Space Dynamic Neural Network (S-SDNN), deconvolution network, Deep Belief Network (DBN), Restricted Boltzmann Machine (RBM), fully convolutional network, Long Short-Term Memory (LSTM) network, and classification network, but is not limited thereto.

Figure 2:
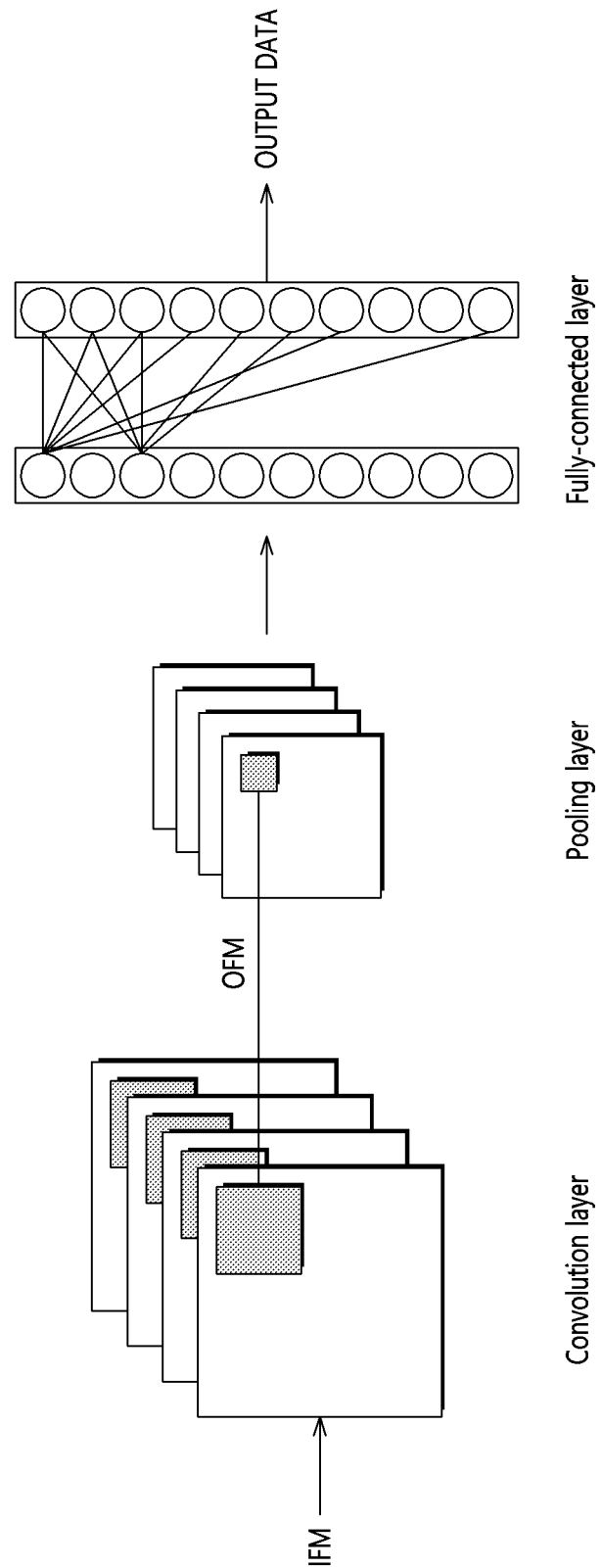
FIG. 2 is a diagram for describing a data processing concept of an artificial neural network in accordance with an embodiment of the present disclosure.

FIG. 2 is a diagram for describing the data processing concept of an artificial neural network in accordance with an embodiment of the present disclosure, e.g., the data processing concept of the CNN.

The CNN may be composed of a convolution layer, a pooling layer and a fully connected layer.

The convolution layer may generate an output feature map OFM by applying a weight matrix (kernel) W to an input feature map IFM.

The pooling layer is a layer for adding spatial invariance to a feature extracted through the convolution layer, and serves to reduce an output of the convolution layer.

The convolution layer and the pooling layer significantly reduce parameters of a neural network, thereby decreasing the complexity of the entire model.

The fully connected layer may generate output data by classifying input data according to the feature extraction result outputted from the pooling layer.

Figure 3:
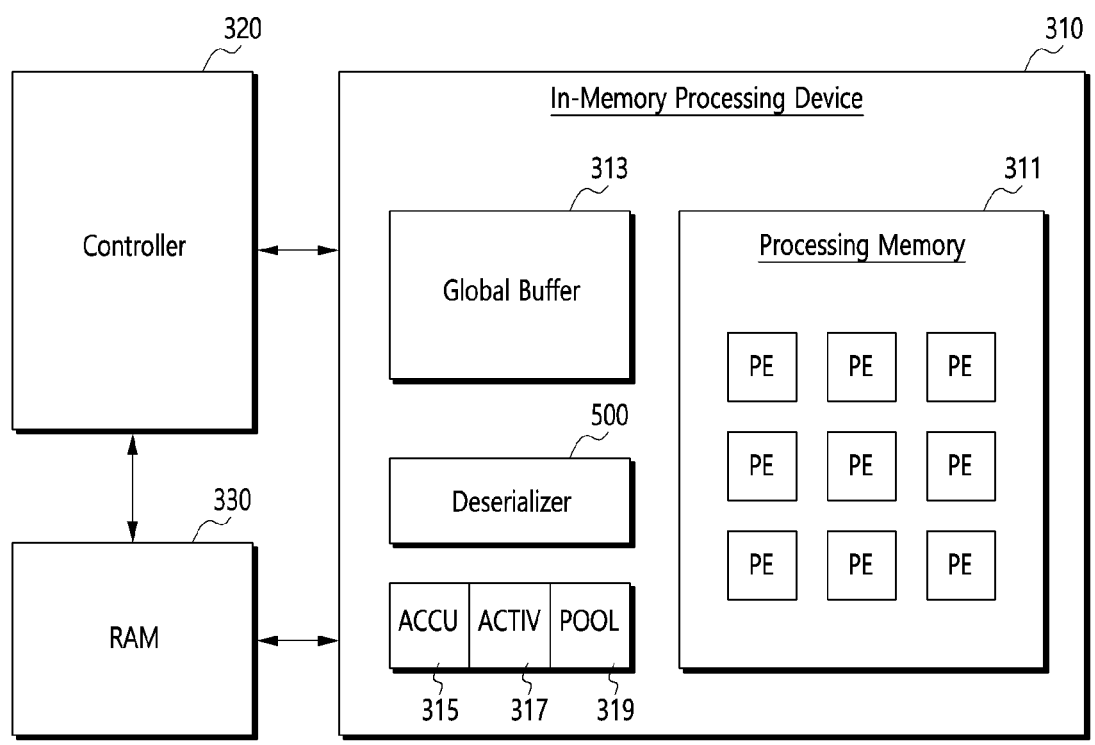
FIG. 3 is a configuration diagram illustrating a neural network processor in accordance with an embodiment of the present disclosure.

FIG. 3 is a configuration diagram illustrating a neural network processor in accordance with an embodiment of the present disclosure.

Referring to FIG. 3, the neural network processor 300 may be a processor or accelerator specialized for neural network processing, and include an in-memory processing device 310, a controller 320 and a RAM 330. In an embodiment, the neural network processor 300 may be implemented as an SoC which is integrated as one semiconductor chip. However, the neural network processor 300 is not limited thereto and may be implemented as a plurality of semiconductor chips.

The controller 320 may control overall operations of the neural network processor 300. The controller 320 may set and manage parameters related to neural network processing such that the in-memory processing device 310 can normally perform neural network processing. The controller 320 may be implemented in hardware, software (firmware) or a combination of hardware and software executed in the hardware.

The controller 320 may be implemented as one or more processors, for example, a Central Processing Unit (CPU), micro processor or the like, and execute an instruction constituting various functions stored in the RAM 330.

The RAM 330 may be implemented as a DRAM, SRAM or the like, and temporarily store various programs and data for an operation of the controller 320 and data generated by the controller 320.

The in-memory processing device 310 may be configured to perform neural network processing under control of the controller 320. The in-memory processing device 310 may include a processing memory 311, a global buffer 313, an accumulation circuit (ACCU) 315, an activation circuit (ACTIV) 317, a pooling circuit (POOL) 319 and a deserializer 500.

The processing memory 311 may include a plurality of processing elements PE. Each of the processing elements PE may receive an input feature map and a weight matrix from the global buffer 313, and perform a convolution operation, e.g., a multiplication and addition for each element.

The global buffer 313 may store the input feature map and the weight matrix therein, and then provide the stored input feature map and weight matrix to the processing memory 311. Furthermore, the global buffer 313 may receive a processing result from the processing memory 311, and store the received processing result. The global buffer 313 may be implemented as a DRAM or SRAM.

The accumulation circuit 315 may be configured to derive a weighted sum by accumulating the processing results of the respective processing elements PE.

The activation circuit 317 may be configured to add non-linearity by applying the weighted sum of the accumulation circuit 315 to an activation function such as ReLU.

The pooling circuit 319 may sample an output value of the activation circuit 317, and reduce and optimize the dimension.

The processing process through the processing memory 311, the accumulation circuit 315, the activation circuit 317 and the pooling circuit 319 may indicate a process of training or retraining a neural network model or inferring input data.

The processing elements PE constituting the processing memory 311 may each include a plurality of sub arrays. Each of the sub arrays may include a plurality of memory cells (e.g., memristors) coupled between a plurality of row lines and a plurality of column lines. As weight data for neural network processing is stored in a memory cell of a sub array and data corresponding to the input feature map is applied to a row line of the sub array, computations within the processing memory 311, e.g., multiplications and additions for the respective elements may be performed.

As the host device 100 offloads neural network processing by transmitting input data and a weight matrix to the neural network processor 300 of the data processing system 200, the controller 320 may transmit weight data and an address, at which the weight data is to be stored, to the in-memory processing device 310.

The deserializer 500 may check whether the number of column lines required for storing the weight matrix, i.e., the dimension (number) of output channels, is less than the number of column lines constituting the sub array. When the number of required column lines is less than the number of column lines within the sub array, the deserializer 500 may reconfigure the storage location for the weight matrix within the sub array, in order to maximize the number of columns in the weight matrix, which are used for one processing operation within the processing memory 311.

In an embodiment, the deserializer 500 may reconfigure the weight matrix by remapping a first column address, at which the respective columns of the weight matrix transmitted from the controller 320 are to be stored, to a second column address.

Since the processing was performed after the storage location of column of the weight matrix, i.e., the column address, was changed, the deserializer 500 may restore the sequence of the processing results outputted from the sub array or the sequence of data outputted from the column lines to the original sequence, such that a subsequent operation is performed without an error. That is, the deserializer 500 is configured to restore the order of data outputted from the column lines to be the same as the result of the operation performed without changing the column address of the weight matrix.

Figure 4:
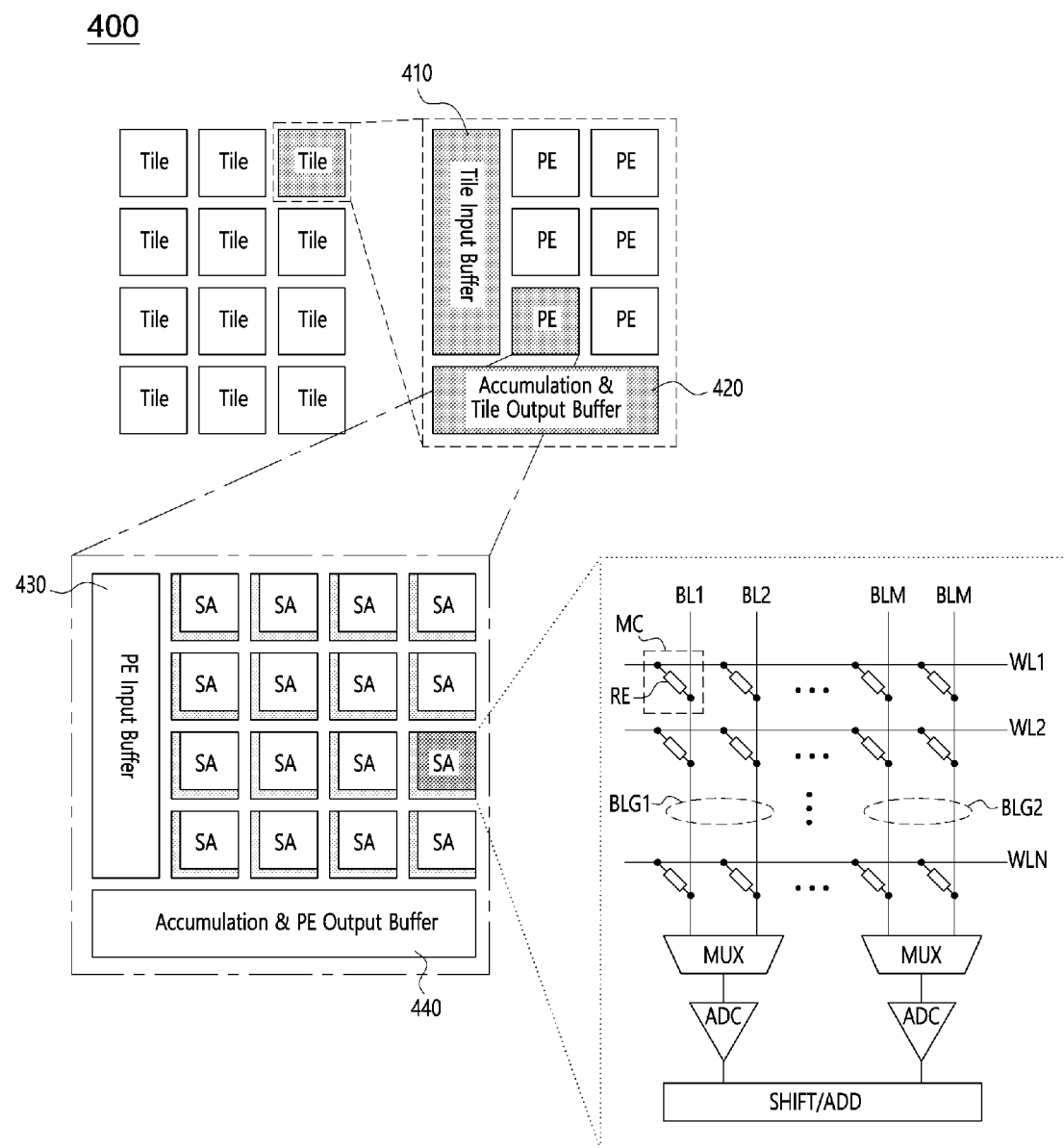
FIG. 4 is a configuration diagram illustrating a processing memory in accordance with an embodiment of the present disclosure.

FIG. 4 is a configuration diagram illustrating a processing memory in accordance with an embodiment of the present disclosure.

Referring to FIG. 4, a processing memory 400 in accordance with an embodiment may include a plurality of tiles.

Each of the tiles may include a tile input buffer 410, a plurality of processing element PE and an accumulation and tile output buffer 420.

Each of the processing elements PE may include a PE input buffer 430, a plurality of sub arrays SA and an accumulation/PE output buffer 440.

The sub array SA may also be referred to as a synapse array, and include a plurality of word lines WL1, WL2, . . . , WLN, a plurality of bit lines BL1, BL2, . . . , BLM and a plurality of memory cells MC. The word lines WL1, WL2, . . . , WLN may also be referred to as row lines, and the bit lines BL1, BL2, . . . , BLM may also be referred to as column lines. In an embodiment, the memory cells MC may each include a resistive memory element RE, or desirably a memristor. However, the present embodiment is not limited thereto. Data values stored in the memory cells MC may be changed by write voltages applied through the word lines WL1, WL2, . . . , WLN and the bit lines BL1, BL2, . . . , BLM, and the resistive memory cells may store data through a resistance change.

In an embodiment, each of the resistive memory cells may be implemented as a Phase change Random Access Memory (PRAM) cell, Resistance Random Access Memory (RRAM)

cell, Magnetic Random Access Memory (MRAM) cell, or Ferroelectric Random Access Memory (FRAM) cell.

Examples of the resistive element constituting the resistive memory cell may include a phase-change material, perovskite compounds, transition metal oxide, magnetic materials, ferromagnetic materials or antiferromagnetic materials, whose crystalline states change according to the amount of current, but the resistive element is not limited.

As the unit cells of the sub array SA are configured as memristors, the processing element PE may store data corresponding to the respective elements of the weight matrix in the memristors, apply voltages corresponding to the respective elements of the input feature map to the word lines WL1, WL2, . . . , WLN, and perform a convolution operation by utilizing Kirchhoff's Current Law and Ohms' law.

Each of the bit lines BL1, BL2, . . . , BLM may also be referred to as an output channel, and coupled to an Analog-to-Digital Converter (ADC). The ADC may sense convolution processing results applied to the bit lines BL1, BL2, . . . , BLM, and output the sensed results as digital values. When the ADC is provided at each of the bit lines BL1, BL2, . . . , BLM, the size of the sub array SA is increased. Therefore, bit line groups BLG1 and BLG2 may be configured by grouping the plurality of bit lines BL1, BL2, . . . , BLM by a designated number, and each coupled to the ADC through a Multiplexer (MUX).

A shifter/adder SHIF/ADD may shift an output value of the ADC in each processing cycle within the memory 311, and add the shifted value to the previous processing result.

As the MUX is used, the area occupied by the ADC may be reduced. However, since the ADC needs to operate a plurality of times corresponding to the number of bit lines included in each of the bit line groups BLG1 and BLG2, the processing speed of the sub array SA may be reduced.

Therefore, when the number of column lines (bit lines) required for storing the weight matrix is less than the number of column lines constituting the sub array SA, the deserializer 500 in accordance with an embodiment may change the mapping information of the column address at which the respective columns of the weight matrix are to be stored, in order to minimize the number of operations of each of the ADCs, thereby maximizing the number of columns in the weight matrix, which are used for one processing operation within the memory 311.

Figure 5:
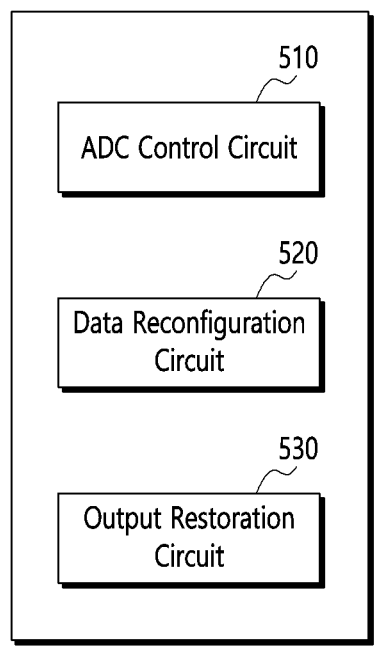
FIG. 5 is a configuration diagram illustrating a deserializer in accordance with an embodiment of the present disclosure.

Since the processing was performed after the storage location of the weight matrix, i.e., the column address, was changed, the deserializer 500 may restore the sequence of the processing results outputted from the sub array, or restore the sequence of data outputted from the column lines to the original sequence, such that a subsequent operation is performed without an error FIG. 5 is a configuration diagram illustrating a deserializer in accordance with an embodiment of the present disclosure.

Referring to FIG. 5, the deserializer in accordance with the present embodiment may include an ADC control circuit 510, a data reconfiguration circuit 520 and an output restoration circuit 530.

When the number of column lines required for storing the weight matrix is less than the total number of column lines within the sub array, the ADC control circuit 510 may decide the matrix splitting rate. In an embodiment, the matrix splitting rate may be a reciprocal number of the number of MUXs or ADCs.

The ADC control circuit 510 may decide an ADC repetition number N on the basis of the matrix splitting rate. In an embodiment, the ADC repetition number N may be calculated by multiplying the matrix splitting rate by the number of columns in the weight matrix. That is, each of the ADCs may operate by a plurality of times corresponding to the number of columns in the weight matrix stored in the column line group to which the ADC is coupled.

Each of the sub arrays SA may operate the MUX and the ADC by the ADC repetition number N, and output the processing result.

The data reconfiguration circuit 520 may split the weight matrix according to the matrix splitting rate, and remap the column address to store the split matrices in column lines coupled to different MUXs.

Figure 6:
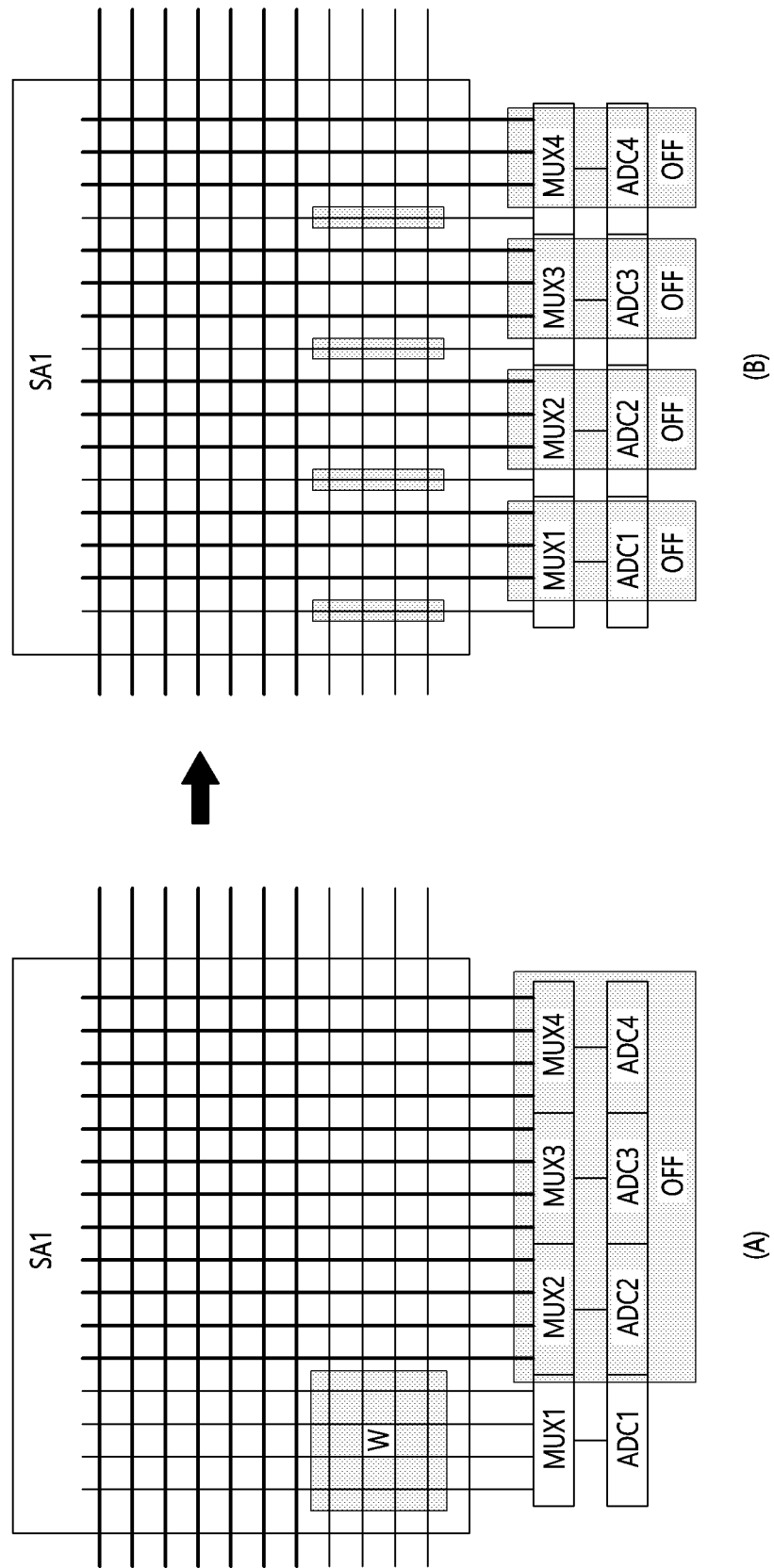
FIGS. 6 and 7 are conceptual views for describing an operation of a data reconfiguration circuit in accordance with an embodiment of the present disclosure.
Figure 7:
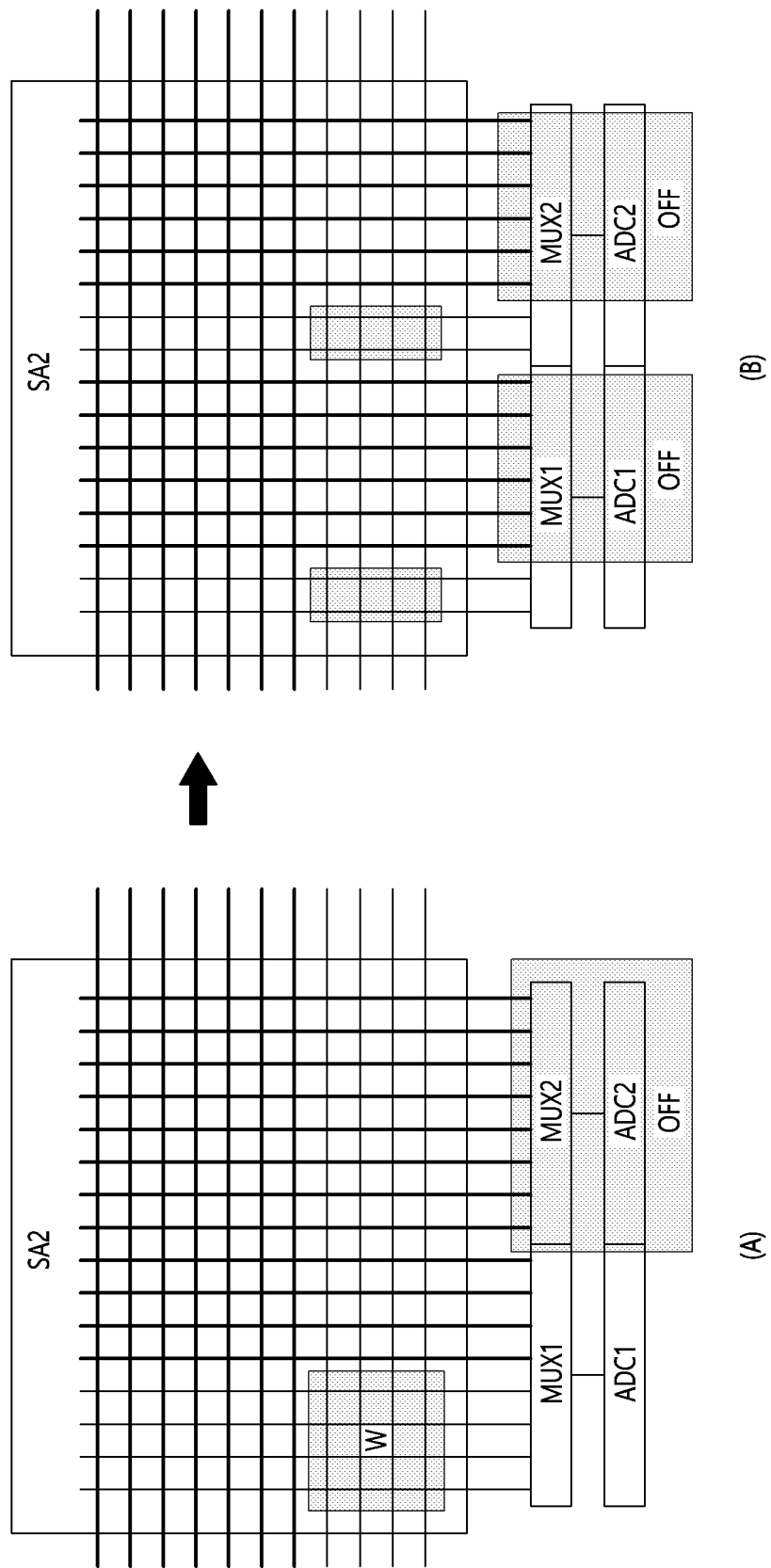

FIGS. 6 and 7 are conceptual views for describing an operation of the data reconfiguration circuit in accordance with an embodiment of the present disclosure.

(A) and (B) in FIG. 6 illustrate the case in which 16 column lines are included in a sub array SA1, and grouped by four and coupled to four MUXs MUX1 to MUX4.

As illustrated in (A) of FIG. 6, when a weight matrix W having a size of 4×4 is sequentially stored from the left of the column lines, the entire weight matrix W is stored in the column line group coupled to the first MUX MUX1. As the first MUX MUX1 sequentially selects four column lines and connects the selected columns to the first ADC ADC1, the second to fourth MUXs MUX2 to MUX4 and the second to fourth ADCs ADC2 to ADC4 are turned off, while the first ADC ADC1 performs four operations. That is, although there are sufficient resources capable of performing processing, the operation may be concentrated on the first ADC ADC1, which reduces the processing speed.

Therefore, the ADC control circuit 510 may split and store the weight matrix W according to the matrix splitting rate, thereby improving the processing speed.

Referring to (B) in FIG. 6, the matrix splitting rate may be set to ¼ because four MUXs are provided. Thus, the ADC repetition number N may be determined to be 1 (=¼*4). The weight matrix W may be split into four parts, and stored in column lines coupled to different MUXs, respectively. Since the weight matrix W has four columns in the embodiment of (B) in FIG. 6, the weight matrix W is split for each column and stored in the column lines coupled to the first to fourth MUXs MUX1 to MUX4, and the first to fourth ADCs ADC1 to ADC4 may be operated by the ADC repetition number N, i.e., once, thereby outputting the processing result.

(A) and (B) in FIG. 7 illustrate the case in which 16 column lines are included in a sub array SA2, and grouped by eight and coupled to two multiplexers MUX1 and MUX2.

As illustrated in (A) of FIG. 7, when a weight matrix W having a size of 4×4 is sequentially stored from the left of the column lines, the entire weight matrix W is stored in the column line group coupled to the first MUX MUX1. As the first MUX MUX1 sequentially selects four column lines and connects the selected column lines to the first ADC ADC1, the second MUX MUX2 and the second ADC ADC2 are turned off, while the first ADC ADC1 performs four operations.

Therefore, the deserializer 500 may calculate a matrix splitting rate of ½ and an ADC repetition number N of 2 (=(½)*4).

Referring to (B) in FIG. 7, since the weight matrix W has four columns, the weight matrix W may be split for each two columns and stored in the column lines coupled to the first and second MUXs MUX1 and MUX2, and the first and second ADCs ADC1 and ADC2 may be operated two times at the same time, and output the processing result.

Since the processing was performed after the storage location of the weight matrix, i.e., the column address was changed, the output restoration circuit 530 may restore the sequence of the processing results outputted from the sub array to the original sequence.

Figure 8:
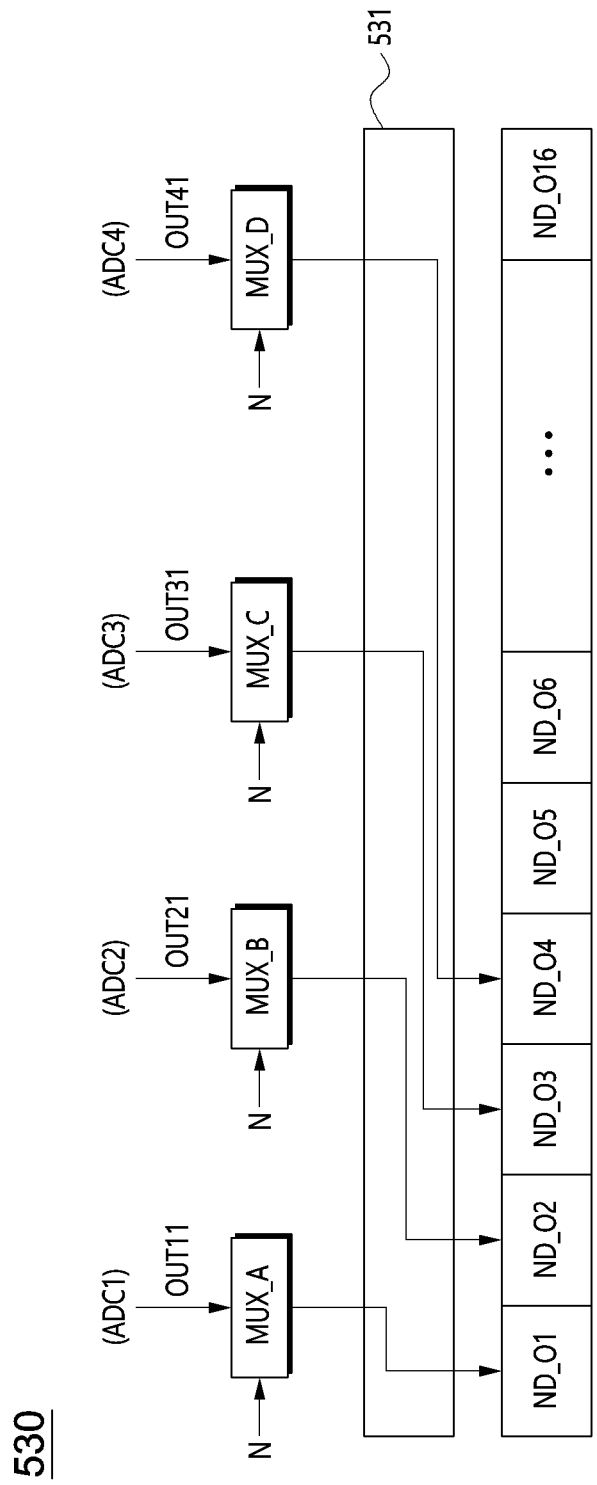
FIG. 8 is a configuration diagram illustrating an output restoration circuit in accordance with an embodiment of the present disclosure.

FIG. 8 is a configuration diagram illustrating an output restoration circuit in accordance with an embodiment of the present disclosure.

FIG. 8 illustrates the output restoration circuit when the mapping of the weight matrix is changed as illustrated in (B) of FIG. 6.

In the case of (B) in FIG. 6, the first to fourth ADCs ADC1 to ADC4 operate once according to the ADC repetition number N, and output first to fourth data OUT11, OUT21, OUT31 and OUT41, respectively.

The output restoration circuit 530 may include a plurality of MUXs MUX_A to MUX_D coupled to the plurality of ADCs ADC1 to ADC4, respectively, and configured to output the output signals of the ADCs ADC1 to ADC4 in response to the ADC repetition number N, and a path control circuit 531 configured to transfer the output signals of the MUXs MUX_A to MUX_D to output nodes ND_O1 to ND_O16.

The path control circuit 531 may restore the sequence of the signals outputted from the plurality of MUXs MUX_A to MUX_D to the sequence before the remapping of the weight matrix, on the basis of column address mapping information and remapping information on the weight matrix.

Figure 9:
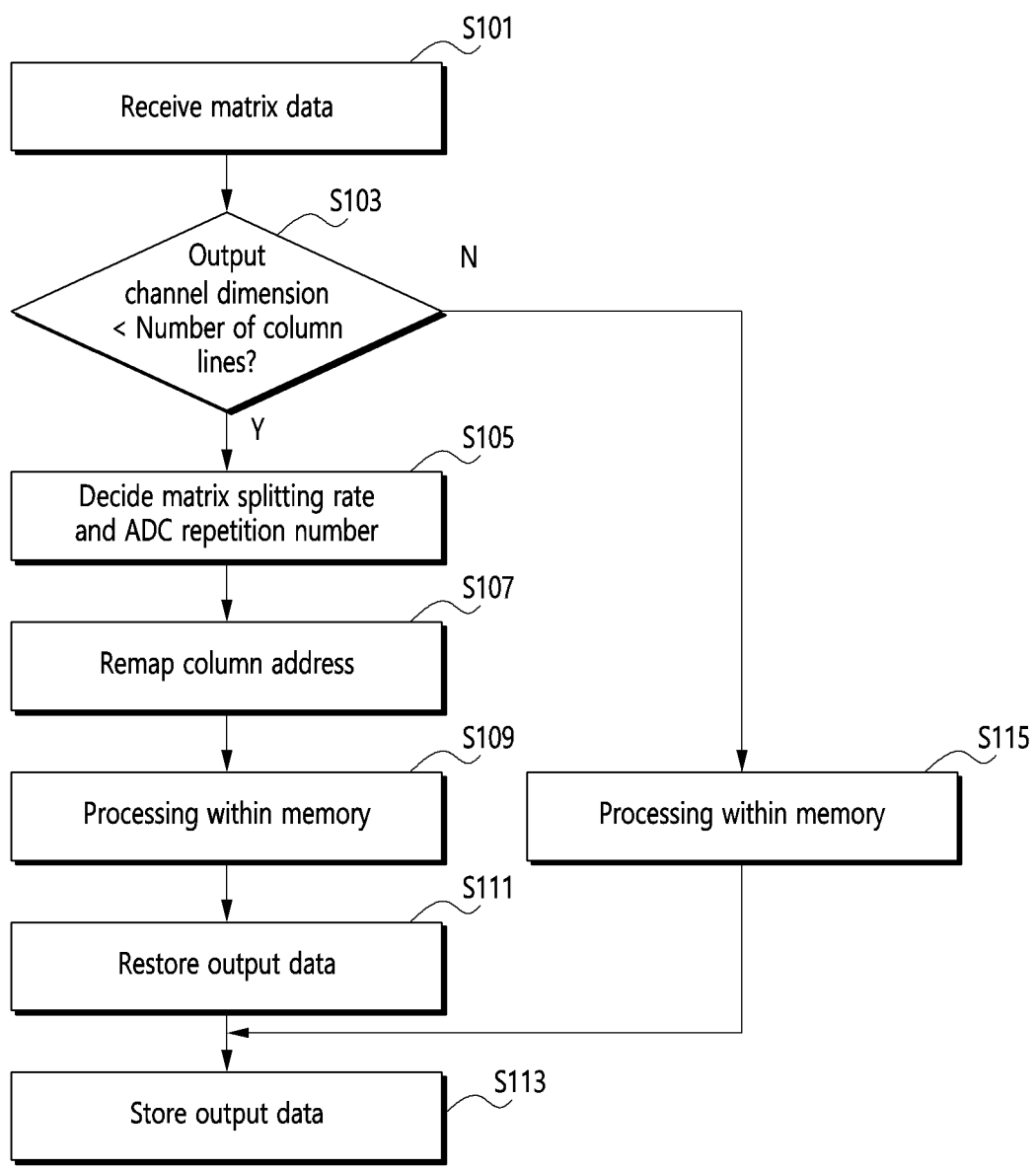
FIG. 9 is a flowchart for describing an operating method of a data processing system in accordance with an embodiment of the present disclosure.

FIG. 9 is a flowchart for describing an operating method of a data processing system in accordance with an embodiment of the present disclosure.

As matrix data for processing within the memory 311, e.g., an input feature map and a weight matrix, are transmitted to the neural network processor 300 in operation S101, the deserializer 500 may compare the dimension of output channels required for storing the weight matrix, i.e., the number of column lines, to the total number of column lines within a sub array, in operation S103.

When the number of column lines required for storing the weight matrix is less than the total number of column lines within the sub array (Y in operation S103), the deserializer 500 may decide the matrix splitting rate and the ADC repetition number N in operation S105.

In an embodiment, the matrix splitting rate may be a reciprocal number of the number of MUXs, and the ADC repetition number N may be calculated by multiplying the matrix splitting rate by the number of columns in the weight matrix.

The deserializer 500 may split the weight matrix according to the decided matrix splitting rate, and remap the column address to store the split matrices in column lines coupled to different MUXs, in operation S107.

As the weight matrix is stored at the remapped column address and data corresponding to an input feature map is applied to a row line of the sub array, the processing within the processing memory 311, i.e., a convolution operation, is performed in operation S109.

The processing results within the processing memory 311 may be restored to the sequence before the remapping in operation S111, and the restored processing results may be stored in the global buffer 313, for example, in operation S113.

When the number of column lines required for storing the weight matrix is equal to or larger than the total number of columns within the sub array (N in operation S103), the processing within the memory 311 may be directly performed without the column address remapping process on the weight matrix in operation S115, and the processing result may be stored in operation S113.

The neural network processor capable of processing an enormous amount of data may split and store the weight matrix in order to maximize the number of ADCs which can operate at the same time as in the present technology, or to minimize the number of operations for each ADC from another point of view. Thus, the neural network processor can improve the data processing speed to enable efficient neural network processing.

While various embodiments have been described above, it will be understood to those skilled in the art that the embodiments described are examples only. Accordingly, the data processing system, the operating method and the computing system, which are described herein, should not be limited based on the described embodiments.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments can be combined to form additional embodiments.

What is claimed is:

1. A data processing system comprising:
   a controller configured to receive a neural network processing request from a host device;
   a processing memory including:
   one or more sub arrays each including a plurality of memory cells coupled between a plurality of row lines and a plurality of column lines;
   a plurality of multiplexers (MUXs) provided for respective column line groups, which are configured by grouping the plurality of column lines by a preset number; and
   a plurality of analog-to-digital converters (ADCs) coupled to the respective MUXs; and
   a deserializer configured to:
   receive, from the controller, data to be stored in a selected sub array and a first column address at which the data is to be stored, and
   remap the first column address to a second column address such that the data is distributed and stored in the memory cells coupled to the plurality of column line groups, in order to store the data in the sub array.

2. The data processing system according to claim 1, wherein the data includes a weight matrix, and wherein the deserializer includes:
   an ADC control circuit configured to determine a matrix splitting rate and an ADC repetition number when a number of column lines required for storing the weight matrix is less than a number of the column lines coupled to the selected sub array; and
   a data reconfiguration circuit configured to:
   split the weight matrix according to the matrix splitting rate, and
   remap the first column address to the second column address such that the individual split matrices are stored in the memory cells coupled to column lines coupled to different MUXs.

3. The data processing system according to claim 2, wherein the ADC control circuit determines a reciprocal number of a number of the MUXs as the matrix splitting rate.

4. The data processing system according to claim 2, wherein the ADC control circuit determines the ADC repetition number by multiplying a number of columns of the weight matrix by the matrix splitting rate.

5. The data processing system according to claim 2,
wherein each of the plurality of ADCs is configured to generate output data by operating a plurality of times corresponding to the ADC repetition number, and
wherein the deserializer further includes an output restoration circuit configured to restore a sequence of the output data of the ADCs on the basis of remapping information including the first column address and the second column address.

6. The data processing system according to claim 1, wherein each of the plurality of memory cells includes a memristor.

7. A data processing system comprising:
a controller configured to receive a neural network processing request from a host device;
one or more sub arrays each including:
a plurality of memory cells coupled between a plurality of row lines and a plurality of column lines, and
a plurality of analog-to-digital converters (ADCs) provided for respective column line groups, which are configured by grouping the plurality of column lines by a preset number; and
a deserializer configured to:
receive, from the controller, data to be stored in a selected sub array and a first column address at which the data is to be stored,
remap the first column address to a second column address to maximize a number of ADCs, which operate at the same time among the plurality of ADCs, and
store the data in the selected sub array.

8. The data processing system according to claim 7,
further comprising a plurality of multiplexers (MUXs) coupled between the column line groups and the ADCs, respectively,
wherein the data is a weight matrix,
wherein the deserializer remaps the first column address to the second column address by splitting the weight matrix by dividing columns of the weight matrix by a number of the MUXs, and
wherein the deserializer stores the data in the selected sub array by storing the split weight matrices in the memory cells coupled to the column line groups coupled to different MUXs.

9. The data processing system according to claim 8, wherein each of the plurality of ADCs is configured to generate output data by operating a plurality of times corresponding to a number of columns of the split weight matrix stored in the memory cells coupled to the column line coupled to the ADC.

10. The data processing system according to claim 7, wherein the controller is configured to store the data in the selected sub array according to the second column address and a voltage corresponding to an input feature map is applied to the row lines of the selected sub array to perform processing within a memory, the deserializer is further configured to restore a sequence of the output data on the basis of the first column address and the second column address.

11. The data processing system according to claim 7, wherein each of the plurality of memory cells includes a memristor.

12. An operating method of a data processing system, the operating method comprising:
providing an in-memory processing device including one or more sub arrays each including a plurality of memory cells coupled between a plurality of row lines and a plurality of column lines, a plurality of multiplexers (MUXs) provided for respective column line groups, which are configured by grouping the plurality of column lines by a preset number, and a plurality of analog-to-digital converters (ADCs) coupled to the respective MUXs;
receiving, by a controller for controlling the in-memory processing device, a neural network processing request from a host device;
receiving, by the in-memory processing device, data to be stored in a selected sub array and a first column address at which the data is to be stored;
remapping, by the in-memory processing device, a first column address to a second column address such that data to be stored in the selected the sub array is distributed and stored in the memory cells coupled to the plurality of column line groups; and
storing, by the in-memory processing device, the data in the selected sub array.

13. The operating method according to claim 12,
wherein the data is a weight matrix,
wherein the remapping includes:
determining a matrix splitting rate and an ADC repetition number when a number of column lines required for storing the weight matrix is less than a number of column lines within the selected sub array; and
splitting the weight matrix according to the matrix splitting rate, and
wherein the storing of the data includes storing the individual split matrices in the memory cells coupled to the column lines coupled to different MUXs.

14. The operating method according to claim 12, wherein the matrix splitting rate is determined to be a reciprocal number of a number of the MUXs.

15. The operating method according to claim 12, wherein the ADC repetition number is determined by multiplying a number of columns of the weight matrix by the matrix splitting rate.

16. The operating method according to claim 12, further comprising:
generating, by each of the plurality of ADCs, output data by operating a plurality of times corresponding to the ADC repetition number; and
restoring, by the in-memory processing device, a sequence of the output data of the ADCs on the basis of remapping information including the first and second column addresses.

17. A computing system comprising:
a host device; and
a data processing system including:
a processing memory including:
a sub array including a plurality of memory cells coupled between a plurality of row lines and a plurality of column lines; and
a plurality of Analog-to-Digital Converters (ADCs) provided for respective column line groups, which are configured by grouping the plurality of column lines by a preset number; and a deserializer configured to:
  receive, from a controller, data to be stored in the sub array and a first column address at which the data is to be stored, and
  remap the first column address to a second column address such that the data is distributed and stored in the memory cells coupled to the plurality of column line groups, in order to store the data in the sub array.

18. The computing system according to claim 17,
wherein the data includes a weight matrix, and
wherein the deserializer includes:
an analog-to-digital converter (ADC) control circuit configured to determine a matrix splitting rate and an ADC repetition number on the basis of a number of the ADCs; and
a data reconfiguration circuit configured to:
  split the weight matrix according to the matrix splitting rate, and
  remap the first column address to the second column address such that the individual split matrices are stored in the memory cells coupled to column lines coupled to different multiplexers (MUXs).

19. The computing system according to claim 18,
wherein each of the plurality of ADCs is configured to generate output data by operating a plurality of times corresponding to the ADC repetition number, and
wherein the deserializer further includes an output restoration circuit configured to restore a sequence of the output data of the ADCs on the basis of remapping information including the first column address and the second column address.

20. The computing system according to claim 17, wherein each of the plurality of memory cells includes a memristor.

* * * * *